May 21, 1929. H. H. MERRIMAN 1,714,464
AUTOMOBILE JACK
Filed June 30, 1927 2 Sheets-Sheet 1
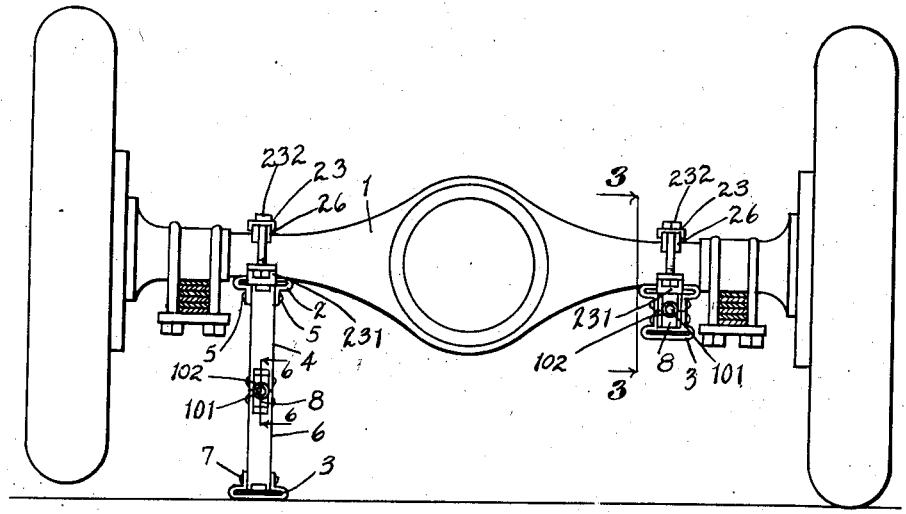
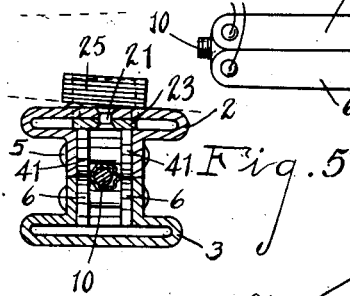
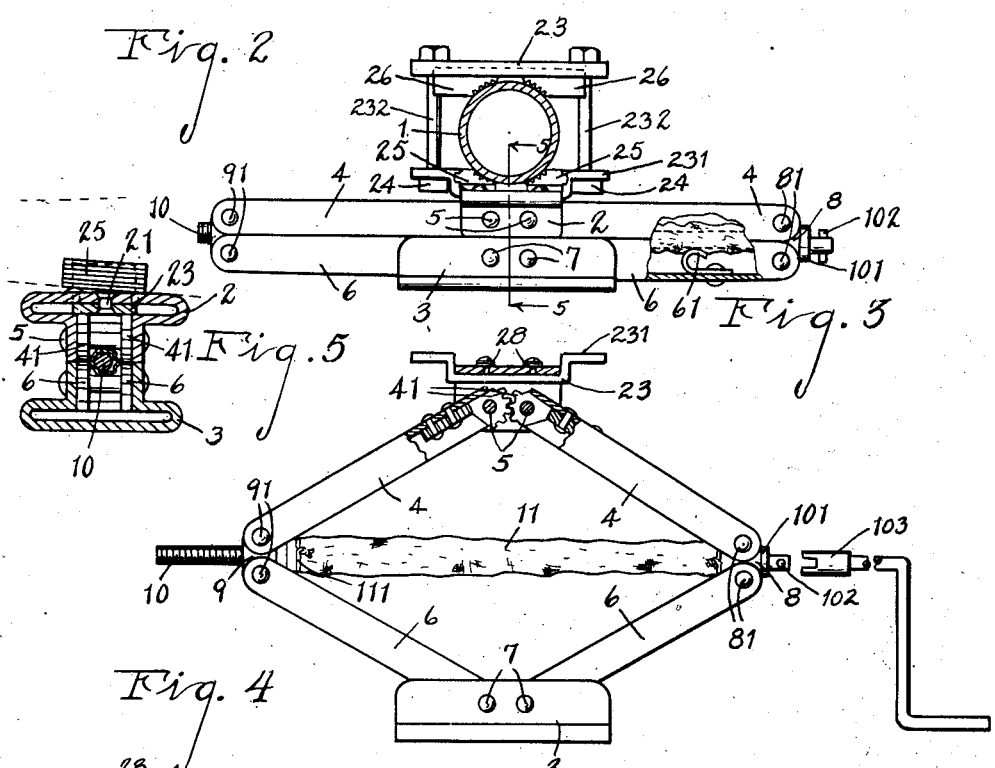
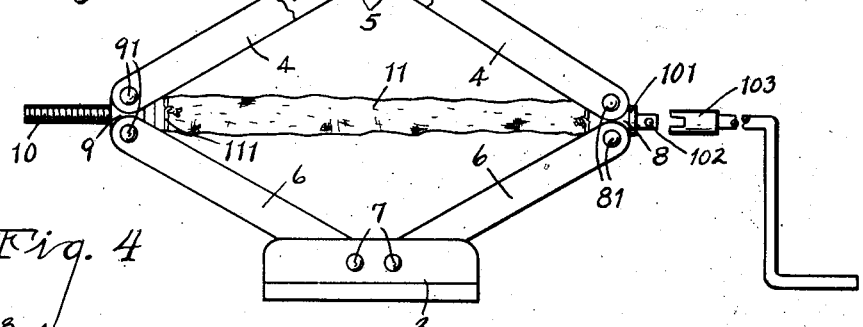
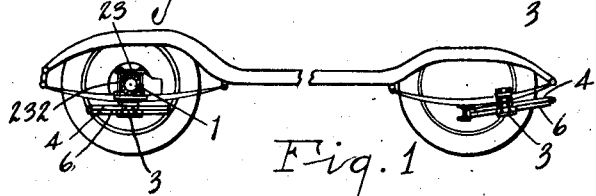
INVENTOR
Henry H. Merriman
BY
ATTORNEYS May 21, 1929.   H. H. MERRIMAN   1,714,464
AUTOMOBILE JACK
Filed June 30, 1927   2 Sheets-Sheet 2

INVENTOR
Henry H. Merriman
BY
ATTORNEYS

Patented May 21, 1929.

1,714,464

UNITED STATES PATENT OFFICE.

HENRY H. MERRIMAN, OF DECKERVILLE, MICHIGAN.

AUTOMOBILE JACK.

Application filed June 30, 1927. Serial No. 202,571.

The objects of this invention are:

First, to provide an improved construction of toggle joint jack attached to the vehicle and transported in position ready for use.

Second, to provide improved axle attaching clamp for such a jack to the rear axle.

Third, to provide an improved spring attaching bracket for such a jack to the front of an automobile.

Fourth, to provide in such a structure improved attaching means that are further an effective housing or box for the actuating parts while being transported.

Fifth, to provide improved arrangement of screw and toggle and lubricating means therefor.

Sixth, to provide an improved foot and head plate construction and connections possessing elasticity.

Objects relating to details and economies of construction and operation will appear from the detailed description to follow. The invention is defined in the claims. A structure which is a preferred embodiment of my invention is illustrated in the accompanying drawing, in which:

Fig. 1 is a detail diagrammatic side elevation of the frame of an automobile showing my improved jacks in carrying position.

Fig. 2 is a detail diagrammatic elevation view of the rear axle of an automobile from the rear, with a pair of my improved jacks in place, one being extended to the lifting position and the other being collapsed to the boxed carrying position.

Fig. 3 is an enlarged detail sectional elevation view taken on line 3—3 of Fig. 2, showing details of the rear axle attaching clamps and showing the jack in collapsed, boxed, carrying position.

Fig. 4 is an enlarged detail view of the jack shown detached with parts broken away to show details of construction of the interlocking gear teeth and toggle and of the lubricant container for the screw, and the lower clamp member and adjacent parts in vertical section.

Fig. 5 is an enlarged detail sectional elevation through the screw and toggle joint connection, showing the method of coupling the lubricant container thereto.

Figure 8:
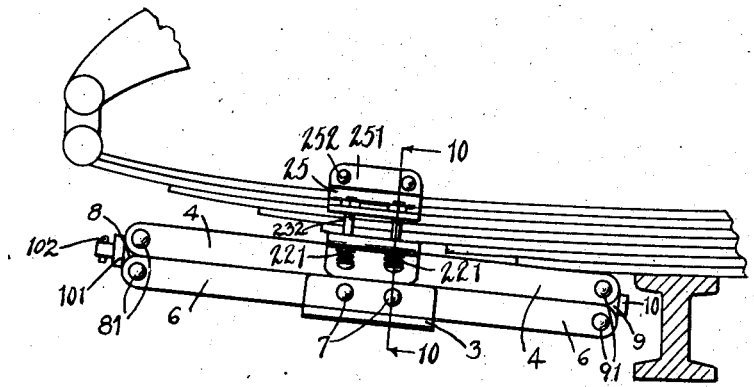
Fig. 8 is an enlarged detail side elevation of the front spring and attaching clamp with my improved jack in collapsed position, the front axle being in section.
Figure 7:
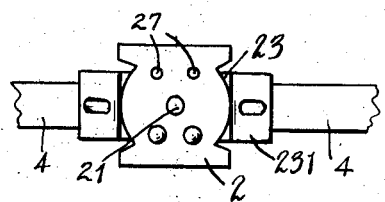
Fig. 7 is an enlarged detail plan view of the top side of the head plate, showing the means to secure adjustable connection for the attaching clip and the means of adapting to the angle of the axle or other part.
Figure 10:
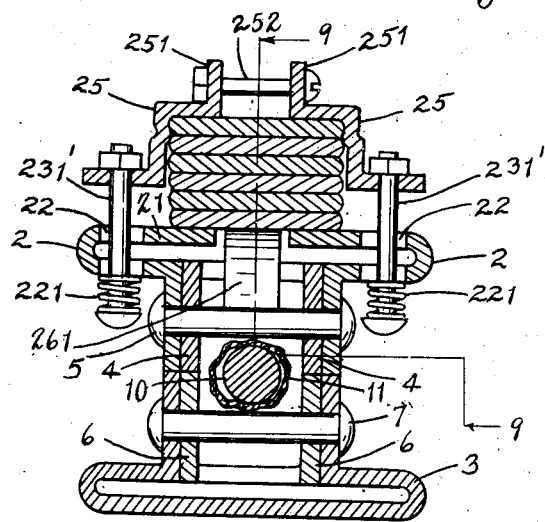
Fig. 10 is an enlarged detail transverse section of the spring attaching clamp, taken on line 10—10 of Fig. 8.

The parts will be identified by their numerals of reference which are the same in all the views.

1 is the rear axle of the automobile shown in conventional form. 2 is the head piece of my improved jack attached to the said rear axle by suitable clip means. 3 is the foot piece. 4 is the upper toggle arm pair made of channel bar pivoted at 5 5 to the head piece 2. 6 is the lower toggle arm pair formed of channel bar pivoted to the foot piece 3 by pivots 7, 7. 8 and 9 are the toggle joint connections to which the said toggle arms 4 and 6 are pivotally connected by pivots 81, 81 and 91, 91 respectively. 10 is the screw extending between the toggle joint connections 8 and 9.

The screw 10 is provided with a collar 101 and is journaled in the joint connection 8. The opposite end is screw threaded through a hole in the toggle connection 9. Hubs are formed on the inner sides of these joint couplings and a fabric tube 11 is disposed around the screw 10 with its ends secured to the said hubs by a strand of wire 111 (see Figs. 4 and 9). The meeting ends of the toggle arms 4 are provided with intermeshing teeth 41 which serve to keep them balanced and equalized. Where the lower arms 6, 6 join to the foot 3, there is no such interlocking connection so that the foot is free to tip to any suitable angle necessary to properly contact with the ground or pavement.

The head pieces 2 and the foot pieces 3 are formed by folding sheet steel upon itself, as shown in Fig. 5. The top or head is riveted at 21 to the clip strap 23 which extends in ears 231 each side of the axle. A toothed block 25 grips the axle housing. A toothed grip bar 26 is disposed on the clip 23 (Fig. 3) and clip bolts 232 secure the clamp in place. The ends of the head 2 are in the arc of a circle. The parts are thus readily adjusted to any angle desired. Holes 27 are to receive rivets with heads to facilitate angular adjustment in attaching. These may have shim washers 28 as well. This facilitates the attachment so that the jack can be set at an angle that will accommodate the running gear or any other parts and make it conveniently accessible. The clips, however, may be of any appropriate design. Those shown are for the rear axle and are a specific form having merit, which I wish to claim specifically.

As illustrated in Fig. 2, the shouldered end of the screw 10 projects to the rear. It is provided with a cross pin 102 for connection to a crank 103 of any desired form. The spring finger 61 is provided in the bottom of the channel 6 to contact with the side of the screw when the jack is closed. The spring finger thus engaging the screw prevents its accidental turning and puts all parts under spring tension so that there can be no slack or rattle in the moving parts.

Figure 9:
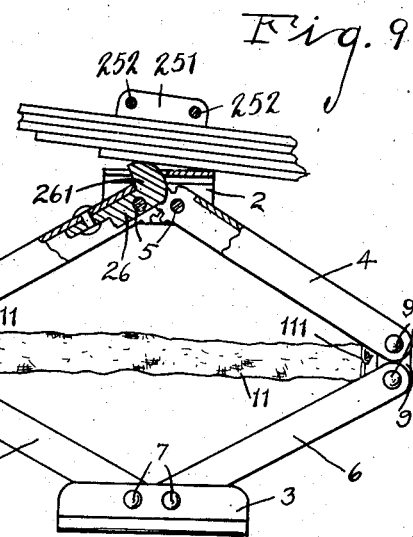
Fig. 9 is a detail elevation similar to Fig. 8 with only a broken section of the spring, with the jack partially extended, the leveler device being in section on line 9—9 of Fig. 10.
Figure 6:
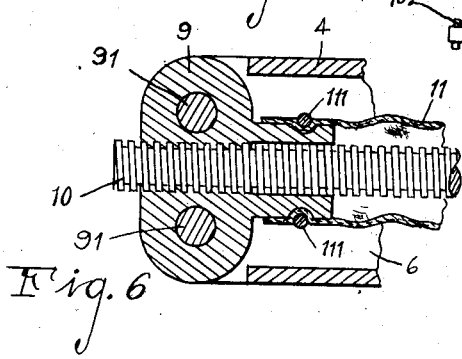
Fig. 6 is a detail sectional end view taken on line 6—6 of Fig. 2, showing the formation of the head and foot pieces of my improved jack, the same being formed and folded of comparatively heavy sheet steel to give strength and elasticity thereto.

It will thus be seen that by simply turning the crank the jack is brought into operation. The foot 3 contacts with the ground and owing to its flexibility and because it is made of steel and is elastic, it adjusts itself freely to the inequalities of the ground, and of course as the toggle approaches a straight line a very strong pressure is exerted which readily lifts the automobile or other vehicle free of the road. By reversing the movement of the screw the jack is collapsed into very compact relation underneath the axle or frame, as the case may be, the toggle arms collapsing and contacting together to bring the whole structure into compact relation like a comparatively small oblong box or straight horizontal bar, see Figs. 3 and 8, which is substantially inconspicuous when disposed inside the spring or parallel therewith, for instance, see Figs. 2, 3 and 8. While the fabric tube saturated with grease would be more or less unsightly, it is entirely encased by the channel toggle arms, as indicated.

Where there is a drop front axle I provide a spring attaching clamp with leveling device. The bracket head piece 2 is modified and extended at 21 beneath the spring. It is perforated at 22 for the clamp bolts 231'. The top clip 25 is divided with upturned ears 251 at the center and adjustably joined by screw bolt 252. Springs 221 are interposed on each clip bolt 231' to permit free spring action. At the inner end of the front channel bar 4 is secured a leveling lug 26 with projection 261 adapted to contact and react on the under side of the spring to level the head, as seen in Fig. 9.

Having thus described my invention, what I claim as new and desire to secure by Letters Patent, is:

1. In a jack, the combination of a head piece formed of folded sheet steel to form a top and side plates, a clip to secure said head to the automobile axle, housing, or frame, a pair of upper toggle arms of channel form with intermeshing gear teeth pivoted to the said head piece, a foot piece formed of folded sheet steel with side plates above, a pair of lower toggle arms of channel form each pivotally connected to said foot piece, toggle joint link block connections pivoted to said toggle arms with inwardly projecting hubs, a screw connecting said blocks journaled through one of said link blocks and screw threaded through the other, a flexible tubular lubricant container secured to the said hubs of said link blocks and surrounding the said screw, and means for driving the said screw to extend the jack or to fold the same into a compact box-like casing beneath the automobile.

2. In a jack, the combination of a head piece formed of folded sheet steel to form a top and side plates, a clip to secure said head to the automobile axle, housing, or frame, a pair of upper toggle arms of channel form with intermeshing gear teeth pivoted to the said head piece, a foot piece formed of folded sheet steel with side plates above, a pair of lower toggle arms of channel form pivotally connected to said foot piece, toggle joint link block connections pivoted to said toggle arms, a screw connecting said blocks journaled through one of said link blocks and screw threaded through the other, and means for driving the said screw to extend the jack or to fold the same into a compact box-like casing beneath the automobile.

3. In a jack, the combination of a head piece formed of folded sheet steel to form a top and side plates, a clip to secure said head to the automobile axle, housing, or frame, a pair of upper toggle arms of channel form with intermeshing gear teeth pivoted to the said head piece, a foot piece formed of folded sheet steel with side plates above, a pair of lower toggle arms of channel form pivotally connected to said foot piece, toggle joint link block connections pivoted to said toggle arms, a screw connecting said blocks, and means for driving the said screw to extend the jack or to fold the same into a compact box-like casing beneath the automobile.

4. In a jack, the combination of a head piece, a clip to secure said head to the automobile axle, housing, or frame, a pair of upper toggle arms with intermeshing gear teeth pivoted to the said head piece a foot piece formed of folded sheet steel with side plates above, a pair of lower toggle arms pivotally connected to said foot piece, toggle joint link block connections pivoted to said toggle arms with inwardly projecting hubs, a screw connecting said blocks journaled through one of said link blocks and screw threaded through the other, a flexible tubular lubricant container secured to the said hubs of said link blocks and surrounding the said screw, and means for driving the said screw to extend the jack or to fold the same into a compact box-like casing beneath the automobile.

5. In a jack, the combination of a head piece, means to secure said head to the automobile axle, housing, or frame, a pair of upper toggle arms of channel form with intermeshing teeth pivoted to the said head piece, a foot piece, a pair of lower toggle arms of channel form pivotally connected to said foot piece, toggle joint link block connections pivoted thereto with inwardly projecting hubs, a screw connecting said blocks journaled through one of said blocks and screw threaded through the other, a flexible tubular lubricant container secured to the said hubs of said link blocks and surrounding the said screw, and means for driving the said screw to extend the jack or to fold the same into a compact box-like casing beneath the automobile.

6. In a jack, the combination of a head piece, a means to secure said head to the automobile axle, housing, or frame, a pair of upper toggle arms of channel form with intermeshing teeth pivoted to the said head piece, a footpiece, a pair of lower toggle arms of channel form pivotally connected to said foot piece, toggle joint link block connections pivoted thereto with inwardly projecting hubs, a screw connecting said blocks journaled through one of said blocks and screw threaded through the other, and means for driving the said screw to extend the jack or to fold the same into a compact box-like casing beneath the automobile.

7. In a jack, the combination of a head piece, means to secure the same to an automobile, a pair of upper toggle arms of channel form pivoted to the said head piece, a foot piece, a pair of lower toggle arms of channel form each pivotally connected to said foot piece, toggle joint link block connections pivoted to said toggle arms to couple the upper pair to the lower pair, a screw connecting said blocks journaled through one block and threaded through the other, means for driving said screw to actuate the jack and to fold the same into a compact box-like casing embracing and enclosing the said screw, as specified.

8. In a jack, the combination of a head piece, means to secure the same to an automobile, a pair of upper toggle arms of channel form pivoted to the said head piece, a foot piece, a pair of lower toggle arms of channel form each pivotally connected to said foot piece, toggle joint link block connections pivoted to said toggle arms to couple the upper pair to the lower pair, a screw connecting said blocks, means for driving said screw to actuate the jack and to fold the same into a compact box-like casing embracing and enclosing the said screw, as specified.

In witness whereof I have hereunto set my hand.

HENRY H. MERRIMAN.